United States Patent [19]

Saro

[11] Patent Number: 4,896,873
[45] Date of Patent: Jan. 30, 1990

[54] DEVICE FOR ISOLATING STACKED BLANKS

[75] Inventor: Karl Saro, Ratingen, Fed. Rep. of Germany

[73] Assignee: Jagenberg Aktiengesellschaft, Dusseldorf, Fed. Rep. of Germany

[21] Appl. No.: 151,352

[22] Filed: Feb. 2, 1988

[30] Foreign Application Priority Data

Feb. 7, 1987 [DE] Fed. Rep. of Germany ....... 3703845

[51] Int. Cl.⁴ .............................................. B65H 3/04
[52] U.S. Cl. ....................................... 271/35; 271/12; 271/102
[58] Field of Search ............................ 271/35, 94–96, 271/99, 102, 132, 12, 13

[56] References Cited

U.S. PATENT DOCUMENTS 2,828,126  3/1958  Labombarde ..................... 271/102
3,887,177  6/1975  Farfaglia ......................... 271/102 X
4,154,438  5/1979  Seragnoli ......................... 271/102 X
4,236,708  12/1980  Matsuo ............................ 271/99 X
4,369,961  1/1983  Gopel .............................. 271/35 X

FOREIGN PATENT DOCUMENTS 2946426  5/1981  Fed. Rep. of Germany .
940198  10/1963  United Kingdom ................ 271/102

Primary Examiner—Richard A. Schacher
Attorney, Agent, or Firm—Sprung Horn Kramer & Woods

[57] ABSTRACT

A device for isolating stacked blanks with at least one blank stop and at least one conveyor belt. The object of the invention is to ensure as complete a contact as possible between even a curved blank and the conveyor belt. An auxiliary suction component, which can be telescoping, is accordingly positioned next to and extending over the conveyor belt and intercepts the undermost blank.

6 Claims, 2 Drawing Sheets

DEVICE FOR ISOLATING STACKED BLANKS

BACKGROUND OF THE INVENTION

The invention relates to a device for isolating stacked blanks with at least one blank stop and at least one conveyor belt.

Isolating devices of this type are employed to supply blanks of paper to folded-bag gluing machines at a prescribed rhythm. This function is carried out in a device known from German OS 2 946 426 by means of conveyor belts that can be raised and lowered. A stack of blanks is placed on the belt guides upstream of a stop in the form of two positioning tongues located approximately the thickness of one blank above the belt. The belts are raised by means of one or more eccentric shafts, intercepting the undermost blank and conveying it though a gap between the stop and the belt, which is maintained in position from below, to the infeed of a folding-and-gluing machine. As the eccentric shaft continues to turn, the conveyor belts are continuously lowered into their disengaged position and then raised again until they intercept the next blank and remove it from the bottom of the stack.

Prerequisite to the smooth removal of the blanks, however, is the least possible slippage between the blank and the belt, which assumes in turn that as much of the surface of the blank as possible is in contact with as much of the surface of the belt as possible.

In order, accordingly, to ensure that the separate blanks are supplied to the folding-and-gluing machine at a prescribed rhythm and at intervals that, aside from changes in the program, are uniform, providing the conveyor belts with suction openings that communicate with a source of vacuum is also known. The suction temporarily positions the undermost blank more or less stationary on the belt.

Even this measure, however, does not always ensure non-slipping removal or isolation of the blanks, which are often concave or convex along or across the direction of travel. Since the curvature depends on the orientation of the fibers in the blank and on its drying behavior during the manufacturing process, it is irregular and cannot be counteracted by adjusting the conveyor belts and/or belt guides.

OBJECT OF THE INVENTION

The object of the invention is accordingly to provide a device that will ensure as complete a contact as possible between even a curved blank and the conveyor belt, no matter how irregularly or in what direction the curvature occurs.

SUMMARY OF THE INVENTION

This object is attained in accordance with the invention in a device of the aforesaid type by the improvement wherein an auxiliary suction component, which can be telescoping, is positioned next to and extending over the conveyor belt and intercepts the undermost blank. The purpose of the auxiliary suction component is to draw the curved section of the blank toward the belt and accordingly ensure complete contact between the belt and the blank even in the vicinity of the curvature.

The auxiliary suction component preferably consists of bellows that are open at the top and communicate with a source of vacuum. The axial flexibility of the bellows allows them to adapt to the curvature of the blank, ensuring that their intake will always be able to come into contact with the blank that is to be isolated, no matter how curved it is.

The auxiliary suction component can have an axial positioning mechanism. This measure can be of advantage when the component, the bellows for instance, is particularly flexible, especially toward the blank. A particularly practical positioning mechanism is a stationary slideover tongue. The blank being isolated slides over the tongue while the auxiliary suction component remains in position.

In this case it is particularly practical to mount one or more auxiliary suction components along with the slideover tongue on a common support.

It is especially practical for the conveyor belts to have suction openings that communicate with a source of vacuum. The suction in the vicinity of the curvature in a blank that is to be isolated will accordingly occur in two stages. In the first stage the blank will be intercepted by the auxiliary suction components and advanced into the range of the suction openings in the conveyor belts, which will then in the second stage come into complete contact with the blank.

BRIEF DESCRIPTION OF THE DRAWING

One embodiment of the invention will now be described in detail with reference to the drawing, wherein.

DETAILED DESCRIPTION OF THE INVENTION

Figure 1:
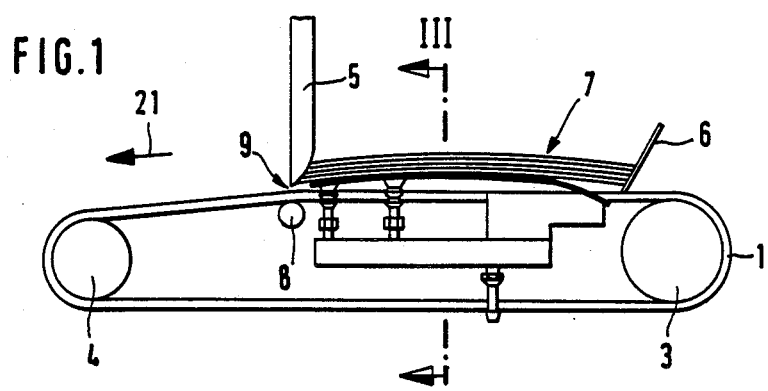
FIG. 1 illustrates an isolation device in accordance with the invention in the disengaged state.

The isolating device has several horizontally adjacent conveyor belts 1. Conveyor belts 1 have suction openings 2 and travel over pulleys 3 and 4. Above conveyor belts 1 are stops 5. A stack 7 of blanks is between stops 5 and a support 6. Below stops 5 is a backing roller 8, creating a nip 9 between conveyor belts 1 and the bottom of the stops. Conveyor belts 1 can be raised and lowered about 3 cm between belt guides 10 and 11 in the vicinity of stack 7. The undermost blank 12 in stack 7 rests on belt guides 10 and 11.

Next to each belt guide 10 and 11 is an auxiliary suction component 13 in the form of a length of chanelled beam 14 with a connection 15 that leads to a source of vacuum and with two bellows 16 and 17. Each bellows has a suction opening 18 and 19, in the vicinity of which they are secured to a slideover tongue 20 that is provided with matching openings. The tongue has a smooth and low-friction surface, preferably being made out of polished steel. It is secured to a bracket 21 on section 14.

Figure 2:
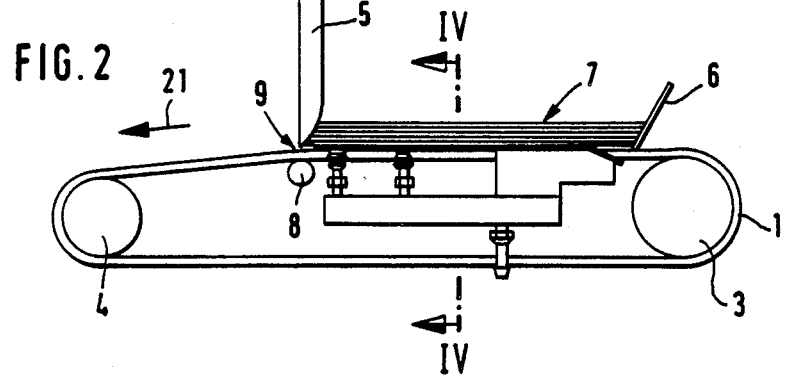
FIG. 2 illustrates the device illustrated in FIG. 1 during the initial stage of isolation.
Figure 3:
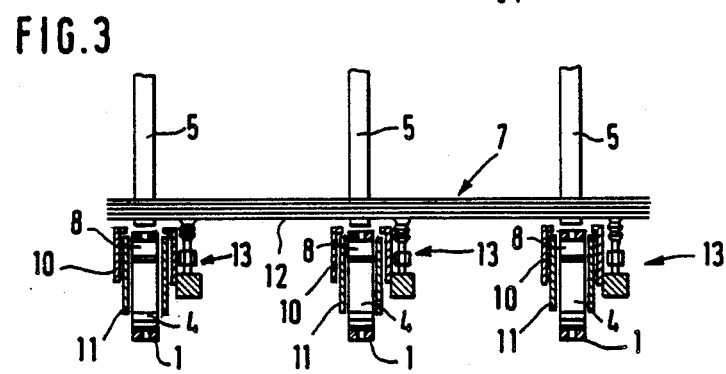
FIG. 3 is a section through the device along the line III—III in FIG. 1.
Figure 4:
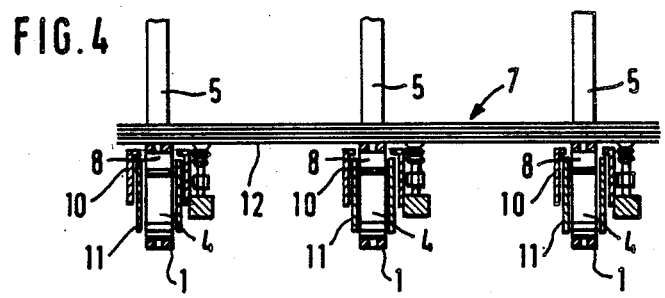
FIG. 4 is a section through the device along the line IV—IV in FIG. 2.
Figure 5:
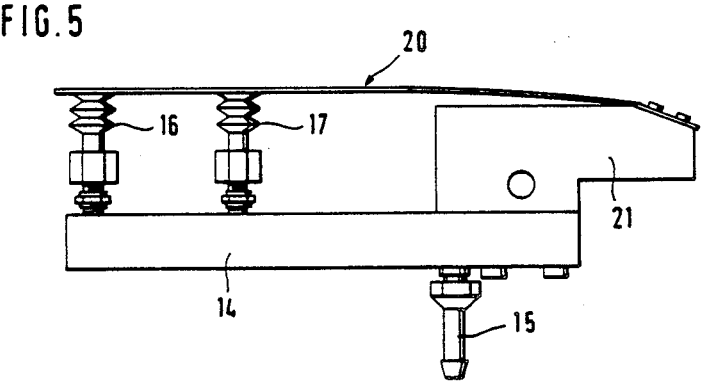
FIG. 5 shows part of the device illustrated in FIGS. 1 through 4 with two auxiliary suction components.
Figure 6:
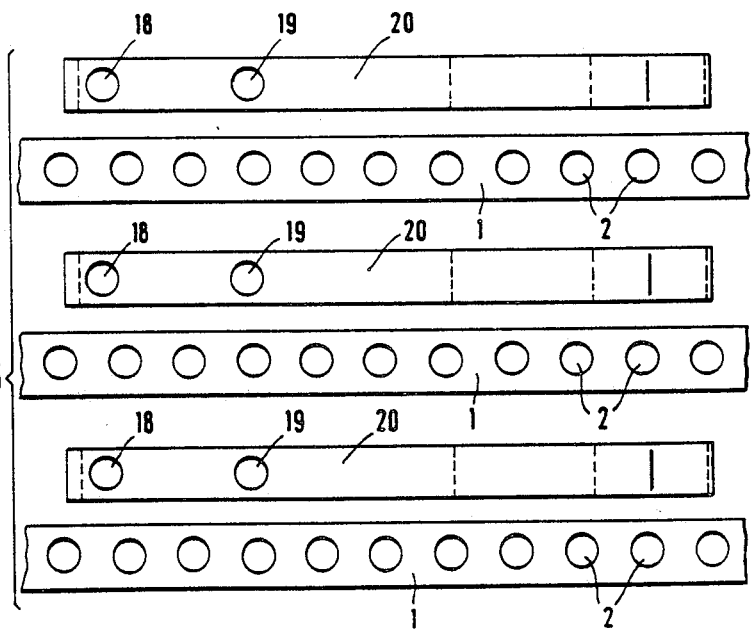
FIG. 6 is a top view of the conveyor belts and auxiliary suction components illustrated in FIGS. 1 through 4.

Due to their axial flexibility bellows 16 and 17 nestle up with their suction openings 18 and 19 in the vicinity of any curvature in the undermost blank 12 being isolated, even when, as illustrated in FIGS. 1 and 3, that area does not rest against belt guides 10 and 11. The blank can accordingly be drawn as illustrated in FIGS. 2 and 4 toward conveyor belts 1 as they are raised for the purpose of isolating it and as the bellows become shorter subject to the vacuum, such that even the area of curvature in the blank will be in contact with the belts. Once conveyor belts 1 are in full-surface contact with blank 12, they will convey it through the nip 9 between stops 5 and the belts in the direction indicated by arrow 21. Suction openings 18 and 19 do not change position, but are secured by slideover tongues 20 and accordingly do not impede the travel of blank 12 because of the tongues' relatively low friction and because the vacuum at their suction openings 18 and 19 is relatively weak and can even be eliminated when the belts take over the conveying process in order to reduce the friction even more. Auxiliary suction components 13 on the whole allow every undermost blank 12 in a stack 7 to be ideally positioned for isolation as illustrated in FIG. 2, making it possible to supply them to the downstream folding-and-gluing machine appropriately oriented and at uniform intervals without any interruptions deriving from inadequate suction and friction between belt and blank as the result of curvature in the blank.

It is understood that the specification and examples are illustrative but not limitative of the present invention and that other embodiments within the spirit and scope of the invention will suggest themselves to those skilled in the art.

What is claimed is:

1. In an apparatus for isolating stacked blanks and including a conveyor belt, a stop for stopping the blanks at a predetermined location on the belt and means for holding the blanks to the belt, the improvement which comprises several auxiliary suction components positioned adjacent the belt and acting upon the undermost blank to pull such blank against the belt, said components being distributed along the direction of travel and secured together by a stationary slideover tongue on a common support.

2. An apparatus according to claim 1, wherein the auxiliary suction components are telescoping.

3. An apparatus according to claim 1, wherein the belt comprises a plurality of parallel sections between which the auxiliary suction components are located.

4. An apparatus according to claim 1, wherein the auxiliary suction components each consists of bellows that are open at the top and communicate with a source of vacuum.

5. An apparatus according to claim 1, wherein the auxiliarly suction components are attached to an axial positioning mechanism.

6. An apparatus according to claim 1, including means for raising and lowering the conveyor belt.

* * * * *